United States Patent
Forsberg et al.

(10) Patent No.: US 9,344,411 B2
(45) Date of Patent: May 17, 2016

(54) KEY HANDLING IN COMMUNICATION SYSTEMS

(75) Inventors: Dan Forsberg, Helsinki (FI); Guenther Horn, München (DE); Ulrike Meyer, Aachen (DE)

(73) Assignee: Nokia Solutions and Networks GmbH & Co. KG, Munich (DE)

( * ) Notice: Subject to any disclaimer, the term of this patent is extended or adjusted under 35 U.S.C. 154(b) by 643 days.

(21) Appl. No.: 12/532,237

(22) PCT Filed: Mar. 18, 2008

(86) PCT No.: PCT/EP2008/053225
§ 371 (c)(1),
(2), (4) Date: Jan. 11, 2010

(87) PCT Pub. No.: WO2008/113804
PCT Pub. Date: Sep. 25, 2008

(65) Prior Publication Data
US 2010/0111308 A1 May 6, 2010

(30) Foreign Application Priority Data
Mar. 21, 2007 (EP) .................................... 07005811

(51) Int. Cl.
*H04L 9/08* (2006.01)
*H04L 29/06* (2006.01)
*H04W 12/04* (2009.01)
*H04W 88/08* (2009.01)

(52) U.S. Cl.
CPC ............ *H04L 63/061* (2013.01); *H04L 9/0844* (2013.01); *H04L 9/0891* (2013.01); *H04W 12/04* (2013.01); *H04L 2209/80* (2013.01); *H04W 88/08* (2013.01)

(58) Field of Classification Search
CPC ..................................................... H04L 9/0891
USPC ......................................................... 380/273
See application file for complete search history.

(56) References Cited

U.S. PATENT DOCUMENTS

| 7,596,225 B2 * | 9/2009 | Mizikovsky et al. ......... 380/273 |
| 7,987,366 B2 * | 7/2011 | Blom .................... H04L 9/0844 380/278 |
| 2005/0277417 A1 * | 12/2005 | Yoon ................. H04W 36/0033 455/436 |

OTHER PUBLICATIONS

3GPP: "3rd Generation Partnership Project; Technical Specification Group Services and System Aspects; Rationale and Track of Security Decisions in Long Term Evolved (LTE) RAN/3GPP System Architecture Evolution (SAE) (Release 8)", 3GPP TR 33.821 V0. 1.0. (Feb. 2007), Technical Report, XP-002445696, 2006, Valbonne, France.*

(Continued)

*Primary Examiner* — Daniel Potratz
(74) *Attorney, Agent, or Firm* — Laurence A. Greenberg; Werner H. Stemer; Ralph E. Locher

(57) ABSTRACT

In a method for key handling in mobile communication systems, first and second numbers are exchanged between entities of the mobile communication system. The first and second numbers are respectively used only once with respect to the respective system parameters of the communication system and therefore allowing greater security in the communication system.

39 Claims, 4 Drawing Sheets

(56) References Cited

OTHER PUBLICATIONS

3GPP: "$3^{rd}$ Generation Partnership Project; Technical Specification Group Services and System Aspects; Rationale and Track of Security Decisions in Long Term Evolved (LTE) RAN/3GPP System Architecture Evolution (SAE) (Release 8)"; 3GPP TR 33.821 VO. 1.0 (Feb. 2007), Techncial Report, XP-002445696, 2006, Valbonne, France.*

3GPP: "3rd Generation Partnership Project; Technical Specification Group Services and System Aspects; Rationale and Track of Security Decisons in Long Term Evolved (LTE) RAN/3GPP System Architecture Evolution (SAE) (Release 8)", 3GPP TR 33.821 VO. 1.0. (Feb. 2007), Technical Report, XP-002445696, 2006, Valbonne, France.

Nokia Siemens Networks: "3GPP TSG SA WG3 Security—SA3#46b Key Refresh in SAE/LTE", S3-070234, XP-002445697, Sophia Antipolis, Mar. 28-29, 2007.

3GPP: "3rd Generation Partnership Project Technical Specification Group Services and System Aspects; 3GPP System Architecture Evolution: Architecture Enhancements for Non-3GPP Accesses; Release 8", 3GPP TS 23/402 VO. 2.0 (Feb. 2007) Technical Specification, GSM Global System for Mobile Communications, Valbonne, France.

3GPP: "3rd Generation Partnership Project; Technical Specification Group Services and System Aspects; 3GPP System Architecture Evolution: Report on Technical Options and Conclusions (Release 7)", 3GPP TR 23.882 V1.8.0 (Feb. 2007) Technical Report, GSM Global System for Mobile Communications, Valbonne, France.

3GPP: "3rd Generation Partnership Project; Technical Specification Group Radio Access Network; Evolved Universal Terrestrial Radio Access (E-UTRA) and Evolved Universal Terrestrial Radio Access Network (E-UTRAN); Radio Interface Protocol Aspects (Release 7)", 3GPP TR 25.813 V7.1.0 (Sep. 2006) Technical Report, Valbonne, France.

3GPP: "3rd Generation Partnership Project; Technical Specification Group Services and System Aspects; 3G Security; Security Architecture (Release 7)", 3GPP TS 33.102 V7.1.0 (Dec. 2006) Technical Specification, Valbonne, France.

* cited by examiner

KEY HANDLING IN COMMUNICATION SYSTEMS

FIELD OF THE INVENTION

The present invention relates to security problems in communication systems, in particular mobile communication systems. More particularly, the present invention relates to a key handling in new types of mobile communication systems. The present application also relates to a security method for allowing secure communication in a communication system, to a communication system allowing for a secure communication, to a user equipment, a mobility management entity and an evolved NodeB in SAE/LTE.

TECHNOLOGICAL BACKGROUND

In a mobile communication system signalling and user plane protocols need to be secured so as to avoid eavesdropping and unauthorised modification of messages. In the following, it is primarily focused on protocols which originate or terminate at the user equipment. Protocols between network nodes are not considered in detail.

The security of protocols is typically achieved by using cryptographic mechanisms such as encryption and integrity protection. These mechanisms rely in turn on cryptographic keys and, in some cases, on counters or sequence numbers which, together with the cryptographic keys and the clear text messages, are put into a function which computes the protected messages sent over the communication link.

In such a known system, the following problem may arise:

Once the same cryptographic key and the same counter is used with different messages, then an attacker could exploit this fact to break security, at least in one of the following two ways.

1. For integrity protection, typically a message authentication code (MAC) is computed from a counter, a cryptographic key and a clear text message. The MAC is then appended to the clear text message and sent together with it over the communication link. The counter may serve to detect attempts by an attacker to replay a previous message, which may lead to undesirable or dangerous effects. When the counter and the cryptographic key are the same for two different messages, an attacker could replace one message with the other and the receiver would not be able to notice it.

2. For confidentiality protection, often a so-called cipher is used. Stream ciphers may be advantageous for radio links as they allow for easy error recovery. A stream cipher produces a pseudorandom bit stream (the key stream) which is XORed with a clear text message, thereby concealing the message from an eavesdropper. The receiver is able to generate the same key stream, subtracted from the received message and recover the clear text message. The generation of the key stream depends on a counter and a cryptographic key. When the counter and the cryptographic key are the same, only the key stream will be the same. But when two different clear text messages are XORed with the same key stream, then the attacker has a strong advantage in finding out the clear text messages.

SUMMARY OF THE INVENTION

It is an object of the invention to provide a solution for the above described problems. Preferably, such solution should be efficiently embedded in other procedures of the mobile communication system or of the respective new communication system.

The present invention applies to a wide range of communication systems such as mobile communication systems, but particularly useful to the SAE/LTE system as described in 3G TR 23.882, 3G TR 25.813 and 3G TS 23.402. SAE/LTE is a mobile communication system which extends and enhances UMTS. The security aspects of SAE/LTE are described in 3G TR 33.821. The security architecture of UMTS is described in 3G TS 33.102.

In particular, the above problem is solved with a security method for allowing secure communication in a communication system where the communication system comprises a first entity, a second entity and a third entity. The first entity and the second entity share a first cryptographic key and a second cryptographic key. And the first entity and the third entity share a third cryptographic key, and possibly further cryptographic keys. The method comprises the steps of sending a first number from the first entity to the second entity. Then, a second number is sent from the second entity to the first entity. Then, a fourth cryptographic key, and possibly further cryptographic keys, is derived at least from one of the first, second or third cryptographic keys and at least one of the first and second numbers in at least one of the first entity and the second entity.

The above method may allow to ensure the freshness of the respective cryptographic keys and counters (sequence numbers) used in conjunction with them. The above solution is particularly efficient and is easily to be embedded in already defined procedures in SAE/LTE.

Furthermore, the above problem may be solved within a communication system adapted to perform the above method wherein the communication system comprises a first entity, a second entity and a third entity. The first entity and the second entity share a first cryptographic key and a second cryptographic key and the first entity and the third entity share a third cryptographic key. The first entity is adapted to send a first number from the first entity to the second entity. The second entity is adapted to send a second number to the first entity. At least one of the first and second entities is adapted for deriving a fourth temporary cryptographic key from at least one of the first, second or third cryptographic keys and at least one of the first and second numbers.

The above communication system which may be a mobile communication system such as a SAE/LTE system may advantageously be secured due to the fact that a freshness of the respective cryptographic keys and counters used in conjunction with these keys may be ensured.

The above object may also be solved by a user equipment, a mobility management entity and/or an evolved NodeB which are adapted to perform the above method.

It may be seen as a gist of the present invention that a nonce is used. A nonce is a number used only once in conjunction with the relevant system parameters. In the above context, the nonce is used only once with respect to a (semi) permanent cryptographic key. In other words, a nonce is exchanged between the entities. This nonce is only used once with respect to a permanent or (semi) permanent cryptographic key provided in at least one of the entities.

With respect to SAE/LTE, the present invention describes a method relating to a data exchange between the user equipment (UE), the mobile management entity (MME) and the evolved NodeB (eNB) such that the UE and the MME share one (semi) permanent (cryptographic) key;

UE and MME share one or more temporary (cryptographic) keys;

UE and eNB share one or more temporary (cryptographic) keys;

UE sends a nonce UE to MME in a state transition;

MME sends a nonce MME (number used only once) to UE in a state transition;

In a state transition, UE, MME and eNB derive new temporary keys from the (semi) permanent key, or from another temporary key by means of suitable key derivation functions, the exchanged nonces and possibly suitable additional input.

BRIEF DESCRIPTION OF THE FIGURES

Further exemplary embodiments of the present invention will now be described and elucidated with reference to the Figures.

DETAILED DESCRIPTION OF EXEMPLARY EMBODIMENTS

Figure 1:
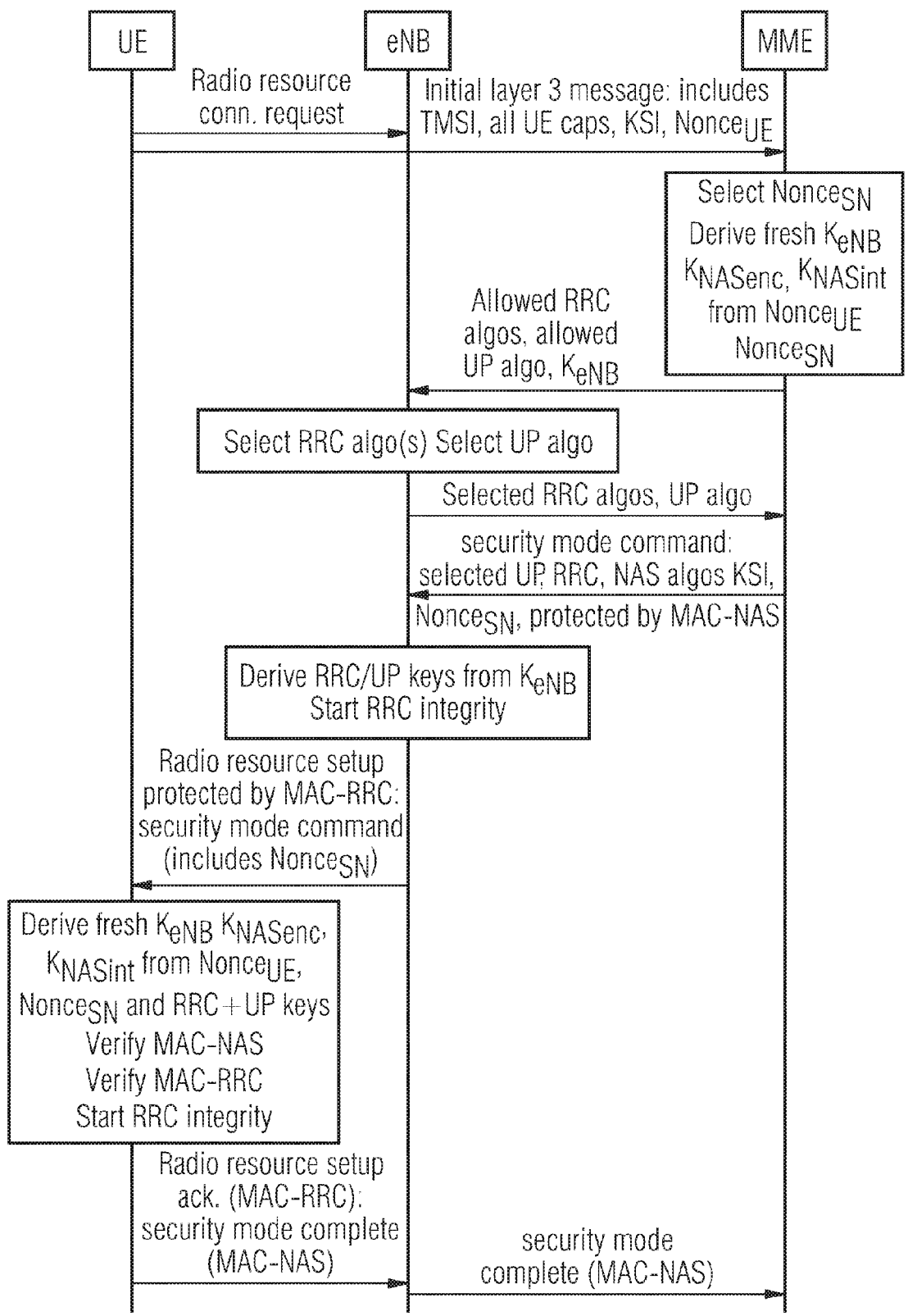
FIG. 1 shows a simplified diagram showing a message exchange between a UE, an eNB and an MME, according to a first exemplary embodiment of the present invention. This embodiment would apply in a state transition from idle to active or detached to active without AKA (authentication and key agreement protocol).

In the following, the present invention will be described in more detail with respect to exemplary embodiments of the present invention.

In SAE/LTE, a UE communicates with a Mobility Management Entity (MME) via the Network Access Stratum (NAS) protocol, and a base station, called evolved NodeB (eNB) via the User Plane (UP) protocol and the Radio Resource Control (RRC) protocol.

The NAS protocol and the RRC protocol require confidentiality protection and integrity protection, while the UP protocol requires only confidentiality protection, cf. 3G TR 33.821 v1.8.0. For each protocol, and each protection mode, a separate cryptographic key and (possibly) an associated counter are required. There are five keys, $K_{NASenc}$, $K_{NASint}$, $K_{RRCenc}$, $K_{RRCint}$, and $K_{UPenc}$. It turns out that a sixth key $K_{eNB}$ is useful in this context, cf. 3G TR 33.821. All these keys are derived from a semi-permanent key K shared between UE and MME. (K is called $K_{ASME}$ in TR 33.821.) K results from a run of the authentication protocol AKA. The definition of these keys is explained in more detail below.

For each of these six keys above, it needs to be ensured that either the key or the associated counter changes for each new message (or link layer frame). While the UE is in active state and keeps sending messages, this is not so much of a problem as it suffices to continuously increase the counters. But when the UE goes into idle state or detaches and keys are stored and reused then all counter values would have to be stored and retransmitted to the other side. This is what the UE does in UMTS, and it is feasible in UMTS as only two keys, and only one network entity are involved. But it becomes quite cumbersome for a larger number of keys and network entities. Furthermore, it is not always clear by means of which protocol messages the counter values would be transmitted to the network entities to which the UE attaches when it goes again into active state. Therefore, another solution to this problem may be desirable.

This solution has to be efficient so that not six different procedures are needed to ensure the freshness of six pairs of (counter, key).

The basic idea is to always refresh the keys in a state transition, then the counter may be initialised to any value, e.g. to zero, as the pair of (counter, key) is then always fresh. This means that it is enough to solve the problem how to refresh the keys for all relevant state transitions.

GSM: in GSM, link layer frame numbers are used as counters. There is a risk of wrap-around of these counters, which are relatively short. Therefore the relevant GSM procedures were enhanced in UMTS, and it is only required in the context of our invention to take into account UMTS.

UMTS: one counter is maintained by the UE side, called START. START counts the number of packets protected with a particular pair of cryptographic keys CK, IK. Even when the UE is not active or is even powered down START has to be stored in non-volatile memory. When the UE becomes active again, the same cryptographic key may be re-used, so it is important that the current counter value START is still available. In fact, in UMTS START is stored on the USIM. A value THRESHOLD needs to be defined to set a maximum for START. When THRESHOLD is reached a new pair of cryptographic keys needs to be negotiated.

There is only one network entity with which the UE communicates securely, the RNC. There is one pair of cryptographic keys, (CK, IK), and there are several counters for several protocols (RRC, RLC, MAC-d) from which START is computed in a complicated fashion.

From 3G TS 33.102:

"The ME and the RNC initialise the 20 most significant bits of the RRC HFN (for integrity protection), the RLC HFN (for ciphering) and the MAC-d HFN (for ciphering) to the START value of the corresponding service domain; the remaining bits are initialised to 0. Also the RRC SN (for integrity protection) and the RLC SN (for ciphering) are initialised to 0.

During an ongoing radio connection, the STARTCS value in the ME and in the SRNC is defined as the 20 most significant bits of the maximum of all current COUNT-C and COUNT-I values for all signalling radio bearers and CS user data radio bearers protected using CKCS and/or IKCS, incremented by 2, i.e.:

$START_{CS}' = MSB_{20}(MAX\{COUNT\text{-}C, COUNT\text{-}I|$ all radio bearers (including signalling) protected with $CK_{CS}$ and $IK_{CS}\}) + 2$.

If current $START_{CS} < START_{CS}'$ then $START_{CS} = START_{CS}'$, otherwise $START_{CS}$ is unchanged.

Likewise, during an ongoing radio connection, the $START_{PS}$ value in the ME and in the SRNC is defined as the 20 most significant bits of the maximum of all current COUNT-C and COUNT-I values for all signalling radio bearers and PS user data radio bearers protected using $CK_{PS}$ and/or $IK_{PS}$, incremented by 2, i.e.:

$START_{PS}' = MSB_{20}(MAX\{COUNT\text{-}C, COUNT\text{-}I|$ all radio bearers (including signalling) protected with $CK_{PS}$ and $IK_{PS}\}) + 2$.

If current START$_{PS}$<START$_{PS}$' then START$_{PS}$=START$_{PS}$', otherwise START$_{PS}$ is unchanged."

It would be useful to avoid these complicated computation rules.

WLAN IEEE 802.11i: in the handshake procedure, both sides produce nonces to generate the session key. There is only one such key. For the so-called CCMP mode, this session key is called the Pairwise Transient Key (PTK). There is only one protocol, which needs to be protected.

For SAE/LTE, there is no solution so far, and due to the different set-up in UMTS and WLAN regarding the number of keys, network entities and protocols involved, it is not straightforward how to carry over solutions from UMTS or WLAN.

According to an exemplary embodiment of the present invention, a method is provided having at least one aspect from the following 23 aspects;

1. A first aspect relates to a procedure in a communication system involving three entities, a first entity called UE, a second entity called MME and a third entity called eNB such that UE and MME share one (semi-)permanent (cryptographic) key;

UE and MME share one or more temporary (cryptographic) keys;

UE and eNB share one or more temporary (cryptographic) keys;

UE sends a Nonce$_{UE}$ to MME in a state transition;

MME sends a Nonce$_{MME}$ (number used only once) to UE in a state transition;

in addition, UE, MME and eNB may exchange further nonces in a state transition;

in a state transition, UE, MME and eNB are able to derive new temporary keys from the (semi-) permanent key, or from another temporary key, by means of suitable key derivation functions, the exchanged nonces and possibly suitable additional input.

2. The communication system in 1. is SAE/LTE as described in 3G TR 23.882 and TS 23.402.

3. The three entities in 1., UE, MME and eNB, are the User Equipment, the Mobility Management Entity and the evolved NodeB in SAE/LTE.

4. The state transitions in 1. are either idle-to-idle, or idle-to-active, or detach-to-active, or (possibly) detach-to-idle state transitions, as described in 3G TR 25.813.

5. The (semi-)permanent key in 1. is the key K$_{ASME}$ in 3G TR 33.821.

6. The temporary keys in 1. include, or may be part of, the set of keys K$_{NASenc}$, K$_{NASint}$, K$_{RRCenc}$, K$_{RRCint}$, K$_{UPenc}$, K$_{eNB}$ as defined in 3G TR 33.821.

7. The nonces in 1. may be random values, or non-repeating counters, or time-stamps, or temporary identities, or combination of these.

8. In a system as in 1., the nonces Nonce$_{UE}$ and Nonce$_{MME}$ may be the only nonces exchanged between the entities UE, MME and eNB in a state transition.

9. In a system as in 1. with a state transition as in 4., the UE and the MME may derive new keys K$_{NASenc}$, K$_{NASint}$ directly from the (semi-) permanent key using the nonces Nonce$_{UE}$ and Nonce$_{MME}$, but possibly no further time-variant input.

10. In a system as in 1. with a state transition as in 4., the UE and the MME may derive a new key K$_{eNB}$ directly from the (semi-) permanent key using the nonces Nonce$_{UE}$ and Nonce$_{MME}$, but possibly no further time-variant input.

11. In a system as in 1. with a state transition as in 4. and key derivation as in 10, the UE and the MME may derive new keys for some or all of K$_{RRCenc}$, K$_{RRCint}$, K$_{UPenc}$ from the key K$_{eNB}$ without further time-variant input.

12. In a system as in 1. with a state transition as in 4., the UE and the MME may derive a new key K$_{eNB}$ directly from the (semi-) permanent key without further time-variant input.

13. In a system as in 1. with a state transition as in 4. and key derivation as in 12, the UE and the MME may derive new keys for some or all of K$_{RRCenc}$, K$_{RRCint}$, K$_{UPenc}$ from the key K$_{eNB}$ using the nonces Nonce$_{UE}$ and Nonce$_{MME}$ as input.

14. In a system as in 1. with a state transition as in 4. and key derivation as in 10 or 12, the UE and the MME may derive new keys for some or all of K$_{RRCenc}$, K$_{RRCint}$, K$_{UPenc}$ from the key K$_{eNB}$ using the nonces Nonce$_{UE}$ and Nonce$_{MME}$ and/or additional nonces exchanged between UE and eNB as input.

15. In a state transition as in 4., the UE may send a Nonce$_{UE}$ to MME in an initial Layer 3 message, as defined in 3G TR 23.882.

16. In a state transition as in 4., the MME may send a NonceMME to UE in a Security Mode Command, as defined in 3G TR 33.821, or TA registration confirmation for idle mode mobility, as defined in 3G TR 23.882.

17. Nonces may also be exchanged between UE and eNB in the RRC connection request and in the RRC setup message.

18. In a system as in 1., all counters associated with a temporary key may be re-initialised to arbitrary values after a new temporary key was derived.

19. Counters as in 18. include, but are not limited to, sequence numbers for replay protection and counters to ensure key stream synchronisation.

20. Nonces generated by MME may fully or partly consist temporary user identities assigned by the MME, such as the S-TMSI, cf. 3G TR 23.882.

21. Nonces generated by eNB may fully or partly consist temporary user identities assigned by the eNB, such as the C-RNTI, cf. 3G TR 25.813.

22. The (semi-)permanent key shared between UE and MME may be stored by the UE on a tamper-resistant hardware module, e.g. in a USIM application on a UICC. For the definition of USIM cf. 3G TR 31.102.

23. In addition to 22, the derivation of temporary keys from the (semi-)permanent key and the exchanged nonces shared may be performed by the UE on a tamper-resistant hardware module, e.g. in a USIM application on a UICC. In this case, for each state transition in which temporary keys are derived, a proof of the presence of the USIM is provided to the network. This protects against attacks where manipulated terminals, e.g. rented terminals, may retain the temporary keys or the (semi-) permanent key after the USIM was removed.

In detail, as may be taken from the above aspects, the following advantages may be achieved. When reviewing the other aspects, it should be kept in mind that SAE/LTE evolves out of UMTS. Thus, advantages can be shown in comparison to UMTS. Advantageously, with the above method, there is no need for a cumbersome handling of the counter START. Furthermore, there is no possibility required for storing START and THRESHOLD for LTE on USIM, no change of USIM for LTE so no additional parameters on USIM. Furthermore, different values of START, one for NAS, RRC, UP would be needed if UMTS solution were to be carried out on LTE. With the above method and system, these complications of counter handling are avoided by just refreshing the keys and resetting the counters to zero or to arbitrary values all the time.

Advantageously, the operation of nonces into SAE/LTE is advantageous due to the fact that up to six cryptographic keys can be updated in exchange of only one nonce from either side, and the counter initialisation storage problems known from UMTS are avoided.

Furthermore, with the above method and system, a protection can be provided against manipulated terminals.

This problem leads to a situation where a manipulated terminal, for example, a rented terminal retains the keys CK and IK after a USIM (Universal Subscriber Identity Module), for example, the USIM of the person renting the terminal was removed from the terminal. If the next call is not authenticated by the network, the CK and IK keys which remained at the terminal can be used by a fraudster controlling the terminal.

In 3GPP it was considered sufficient that the authentication protocol AKA (as defined in TS 33.102/TR 31.900) is run sufficiently often. In LTE, there is now provided an intermediate key, namely the key K. It may be true that there is a requirement not to have to change the USIM for LTE access. But, if in future releases of USIMs, K is stored on the UICC and does not leave the UICC, then the manipulated terminal threads can be countered using the key refresh mechanism as described above, as this key refresh would only work with the involvement of the USIM.

This will be described in further detail with reference to the following four exemplary embodiments:

The following notations are used for the different keys in SAE/LTE:

K: Key shared between UE and MME, established with the help of HSS during AKA. AKA is the authentication and key agreement protocol known from 3G TS 33.102. This key is called $K_{ASME}$ in 3G TR 33.821. It changes on every AKA.

$K_{NASenc}$, $K_{NASint}$: Keys shared between MME and UE for encryption and integrity protection of NAS signaling. Refreshed on every detached to active and idle to active transition, on idle mode mobility, and if K changes.

$K_{eNB}$: Intermediate key shared between UE and eNB for the derivation of $K_{RRCenc}$, $K_{RRCint}$, $K_{UPenc}$: Refreshed on idle to active transitions and if K changes.

$K_{RRCenc}$, $K_{RRCint}$, $K_{UPenc}$: Keys shared between UE and eNB for encryption and integrity protection of RRC signalling and for encryption of UP traffic. Refreshed if $K_{eNB}$ changes.

In the examples detailed below, keys are refreshed with the help of two nonces ($Nonce_{UE}$ and $Nonce_{SN}$) exchanged between UE and the network. One example of the proposed use of the nonces in the key derivation functions (KDF) is as follows:

1) $K_{NASint}$=KDF(K||$Nonce_{UE}$||$Nonce_{SN}$||"NAS integrity")
2) $K_{NASenc}$=KDF(K||$Nonce_{UE}$||$Nonce_{SN}$||"NAS encryption")
3) $K_{eNB}$=KDF(K||eNB Id||$Nonce_{UE}$||$Nonce_{SN}$)
4) $K_{UPenc}$=KDF($K_{eNB}$||"UP encryption")
5) $K_{RRCenc}$=KDF($K_{eNB}$||"RRC encryption")
6) $K_{RRCint}$=KDF($K_{eNB}$||"RRC integrity")

The keys may additionally depend on other input parameters that are not relevant in the context of this invention (e.g. $K_{UPenc}$ may additionally depend on an identifier for the encryption algorithm it is going to be used on).

In the following there are some examples for how the pair of nonces $Nonce_{UE}$, $Nonce_{SN}$ can be exchanged between UE and the network during different types of state transitions and on idle mode mobility:

Example 1

Idle to Active Transitions and Detached to Active Transitions without AKA

In these two types of state transitions the six keys $K_{NASenc}$, $K_{NASint}$, $K_{eNB}$, $K_{RRCenc}$, $K_{RRCint}$, $K_{UPenc}$ are refreshed by including $Nonce_{UE}$ in the initial layer 3 message sent from UE to MME and including the $Nonce_{SN}$ in the security mode command message sent from MME to UE.

As shown in FIG. 1, first, the respective UE includes a $nonce_{UE}$ in the initial layer 3 message sent to the MME. Before that, the UE sends the radio resource connection request to the eNB. Then, the MME selects $nonce_{SN}$ and it includes it in the security mode. The MME derives $K_{eNB}$, $K_{NASenc}$ and $K_{NASint}$ from the nonces and the KASME generated during the last AKA run.

Then, the MME transfers the $K_{eNB}$ to the eNB and includes the $nonce_{SN}$ in the security command sent to the eNB. The security command is integrity protected with the new NAS key (NAS-MAC). Then, the eNB derives the RRC and UB keys from the received fresh $K_{eNB}$ as described in aspects 1., 2. and 3. above.

Then, the eNB includes the security mode command message in the radio resource setup message. This message is protected with the new RRC integrity key (RRC-MAC).

Then, UE derives $K_{NASenc}$ and $K_{NASint}$, $K_{eNB}$ from KASME and the $nonce_{UE}$ and $nonce_{SN}$ as described in aspects 1., 2. and 3. above. Then, UE derives $K_{RRCenc}$, $K_{RRCint}$, $K_{UPenc}$ from the fresh $K_{eNB}$ as described in aspects 4., 5. and 6. respectively.

Eventually, the UE starts using the new NAS, UP and RRC integrity keys. By this, the freshness of the respective keys may be ensured.

It may be appreciated that the exact form of security mode and procedure is irrelevant for the above method. However, it should be noted that the MME can include $nonce_{SN}$ in the security mode command message. In a case where the UE needs to protects the initial layer 3 message and thus also authenticates itself to the network it may use the current $K_{NASint}$ and use the next sequence number to integrity protect the message. Then, the UE needs to store the SN for the NAS signalling. Alternatively, the UE may also take the K and $nonce_{UE}$ and derive a new key $K_{NASint}$ which it then can use to integrity protect the initial layer 3 message. In addition to the nonces and keys, additional input parameters may be used for the key generation. For example the KSI may be used. This $nonce_{UE}$ would then need to be an increased counter such as, for example, a time stamp.

Figure 2:
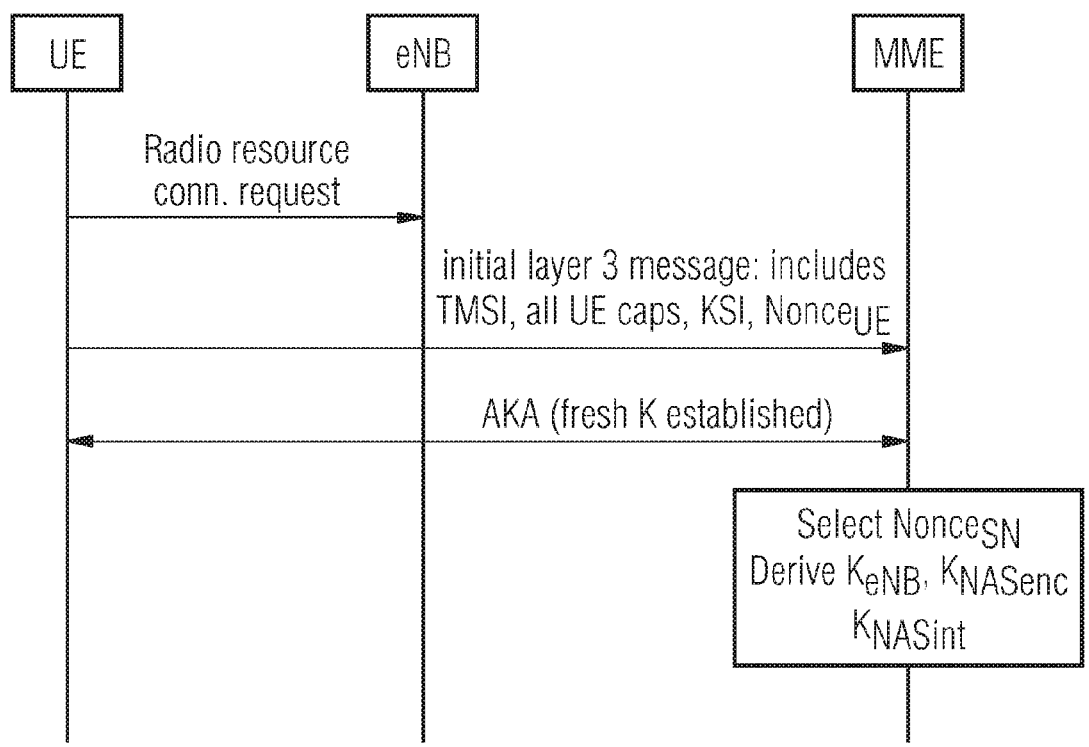
FIG. 2 shows a simplified message exchange between a UE, an eNB and an MME, according to a second exemplary embodiment of the present invention. This embodiment would apply in a state transition from idle to active or detached to active with AKA (authentication and key agreement protocol).

The second example relates to key re-fresh on idle or detach to active transition with AKA as shown in FIG. 2.

In these two state transitions, all seven keys (K, $K_{NASenc}$, $K_{NASint}$, $K_{eNB}$, $K_{RRCenc}$, $K_{RRCint}$, $K_{UPenc}$) are refreshed by the refresh of K during the authentication. However, as it is advantageous that the key refresh procedure is independent of whether or not a run of AKA takes place, the nonces are proposed to be generated and exchanged in the same way as in an idle to active transition.

As can be taken from FIG. 2, after the radio resource connection request sent from the UE to the eNB, the UE sends a layer 3 message to the MME including, as in the example of FIG. 1, the TMSI, UE, KSI and the $nonce_{UE}$.

Then, a fresh K is established with AKA. The MME selects the $nonce_{SN}$ and derives the $K_{eNB}$, $K_{NASenc}$, and $K_{NASint}$.

The MME and UE agree upon a new $K_{ASME}$ during AKA.

Then, the method may be continued as shown in FIG. 1 where the MME signals the allowed RRC algo(s), the allowed UP algo, and the $K_{eNB}$ to the eNB. The eNB then selects the respective RRC algo(s) and select the respective UP algo. After these selections in the eNB, the eNB signals the selected RRC algo(s), UP algo to the MME. In a security mode command, the MME sends signals to the selected UP, RRC, NAS algo(s), KSI, the $nonce_{SN}$ to the eNB which are protected by the MAC-NAS.

On the basis of this, the eNB derives the RRC/UP keys from $K_{eNB}$ and start the RRC integrity procedure. Then, the radio resource setup is performed protected by MAC-RRC with a security mode command including the nonce$_{SN}$.

In response to that, UE derives fresh $K_{eNB}$, $K_{NASenc}$, $K_{NASint}$ from the nonce$_{UE}$ and $_{NC}$ and the RRC and UP keys. The UE verifies the MAC-NAS and the MAC-RRC and starts the RRC integrity.

After having finished that, the UE sends a radio resource setup acknowledgement (MAC-RRC) which completes the security mode (MAC-NAS). After having received this acknowledgement, the eNB sends a security mode complete message (MAC-NAS) to the MME.

Figure 3:
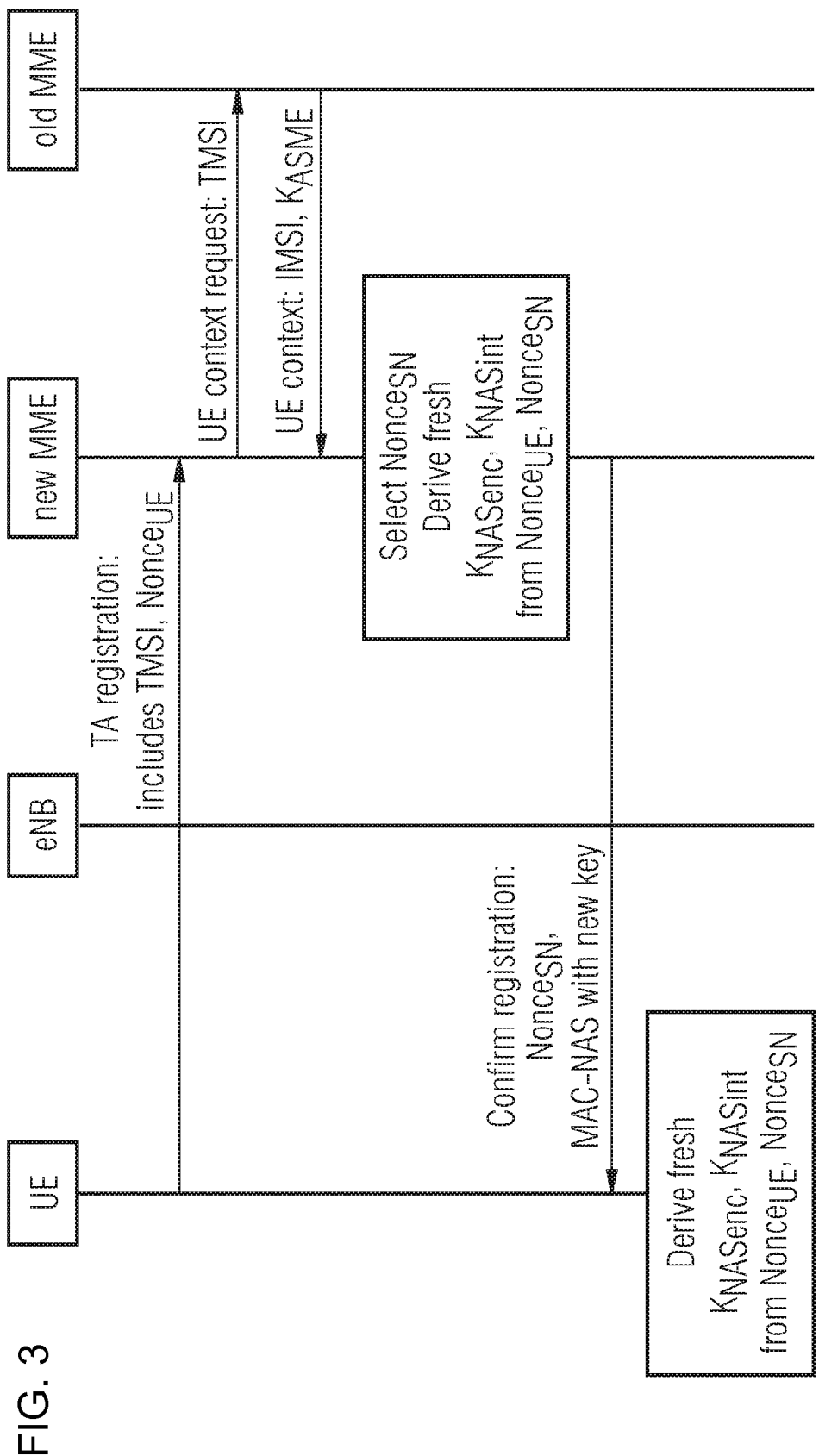
FIG. 3 shows a simplified message exchange between a UE, an eNB, a new MME and an old MME, in accordance with a third exemplary embodiment of the present invention. This embodiment would apply in a state transition from idle to idle without AKA (authentication and key agreement protocol).

FIG. 3 shows a key re-fresh on idle mode mobility, i.e. an idle to idle transition, without AKA. The exemplary embodiment is built on the assumption that no secure RRC connection has to be set up for a tracking area (TA) registration request due to idle mode mobility. Only the NAS keys are refreshed in this case. In accordance with this exemplary embodiment, the UE includes the nonce$_{UE}$ in the TA registration request sent to the new MME whilst the new MME selects the nonce$_{SN}$ and includes it in the registration confirmation message. This message has then already been protected with the refreshed NAS keys.

As depicted in FIG. 3, initially, the UE sends the TA registration message including the TMSI and the nonce$_{UE}$ to the new MME. The new MME then sends a UE context request including the TMSI to the old MME. The old MME responds with a UE context message including the IMSI and the $K_{ASME}$. In response to this message received from the old MME, the new MME selects the nonce$_{SN}$ and derives fresh $K_{NASenc}$ and $K_{NASint}$ keys from the nonce$_{UE}$ received in the TA registration message from the UE and the nonce$_{SN}$ selected in the new MME. Then, from the new MME, the registration is confirmed. This message includes the nonce$_{SN}$ and the MAC-NAS with the new keys. After having received this message, the UE derives fresh $K_{NASenc}$ and $K_{NASint}$ keys from the nonce$_{UE}$ and the nonce$_{SN}$ received from the new MME.

In short, the UE includes the nonce$_{UE}$ in the TA registration request sent to the new MME. Then, the new MME requests UE context from the old MME including the TMSI. Then, the old MME sends the UE context to the new MME, including IMSI and $K_{ASME}$. Optionally, the UE and the new MME may agree upon a fresh $K_{ASME}$ with the help of AKA as, for example, described with respect to FIG. 4 below. The new MME may select a new nonce$_{SN}$ and may derive at $K_{NASenc}$ $K_{NASint}$ keys as described in aspects 1. and 2. above.

The new MME may then send the confirm registration message to the UE including the nonce$_{SN}$. This message is already protected by the new NAS integrity. Now, the UE may derive fresh $K_{NASenc}$ and $K_{NASint}$ keys as described in 1. and 2. above.

In case the UE needs to protect the initial layer 3 message and thus also to authenticate itself to the network, it may use current $K_{NASint}$ and use the next sequence number to integrity protect the message. Then, the UE needs to store the SN for the NAS signalling. Another option may be to let the UE take the K and nonce$_{UE}$ and derive a new key $K_{NASint}$ which it can use to integrity protect initial layer 3 message. For this key generation, further input parameters such as, for example, the TMSI may be used.

In the following, an idle mode mobility key refresh with AKA will be described with reference to FIG. 4. In this fourth exemplary embodiment, if upon idle mode mobility the new MME requests a new AKA, then K and NAS keys are refreshed. The key K is refreshed during the AKA and the new K as well as nonces exchanged in the idle mode mobility without AKA are used to refresh $K_{NASenc}$ and $K_{NASint}$ as described in aspects 1. and 2. above.

Figure 4:
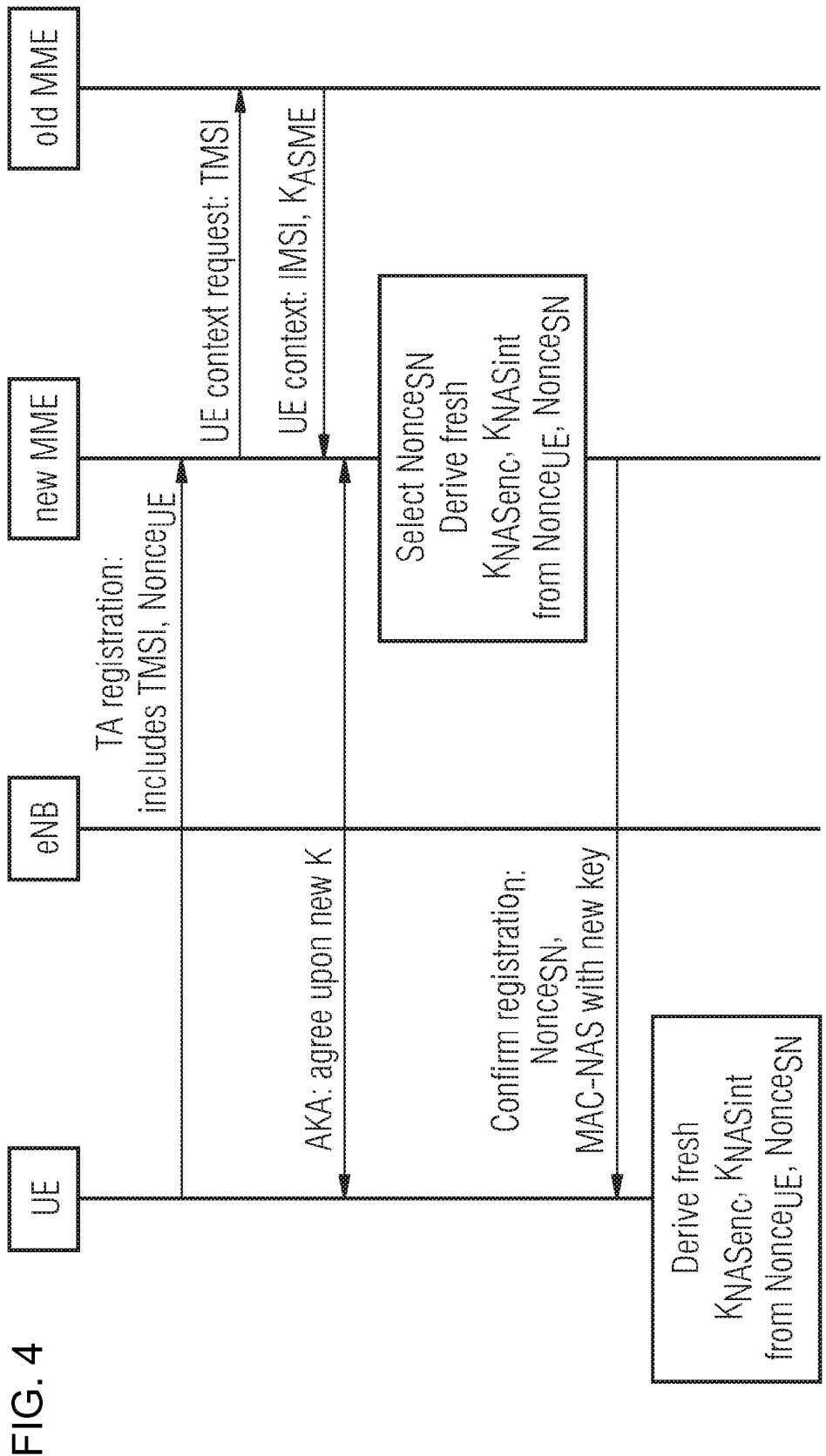
FIG. 4 shows a message exchange between a UE, an eNB, a new MME and an old MME, according to a fourth exemplary embodiment of the present invention. This embodiment would apply in a state transition from idle to idle with AKA (authentication and key agreement protocol).

As may be taken from FIG. 4, the UE starts by sending the TA registration including the TMSI and the nonce$_{UE}$ to the new MME. Then the new MME sends the UE context request including the TMSI to the old MME which responds by sending the UE context including the IMSI and the $K_{ASME}$ message to the new MME which then starts the AKA where the UE and the new MME agree upon a new K key. Then, the method continues as shown described with reference to FIG. 3.

According to an exemplary embodiment, on idle to active transitions, nonce$_{SN}$ and nonce$_{UE}$ could be used as input to the key generation functions for $K_{RRCenc}$ and $K_{RRCint}$, $K_{UPenc}$ keys directly instead indirectly by the use of $K_{eNB}$. In this case the MME would have to transfer both nonces to the eNB, for example, in the message including $K_{eNB}$.

Furthermore, according to another exemplary embodiment, on idle to active transitions, an additional pair of nonces could be exchanged between eNB and UE. The UE could include a nonce in the RRC connection request and eNB could include a nonce in the RRC setup message.

According to another exemplary embodiment, the C-RNTI could be realised as nonce$_{SN}$ or part of the nonce$_{SN}$. Also, the S-TMSI could be used as nonce$_{SN}$ or part of the nonce$_{SN}$.

According to a further exemplary embodiment, the nonce need not be a random number, it only has to be ensured that the nonce has not been used before with the same $K_{ASME}$. Thus, the nonce could always be a counter maintained in the respective site. The counter could count messages or link layer frames or packets or the number of state transitions or any other number of units. In this respect, even the use of a counter such as START as defined in UMTS (cf. 3G TS 33.102) could be used as the nonce$_{UE}$.

In another exemplary embodiment of the present invention, if a RRC connection is set up on a TA registration before idle mode mobility, the nonce$_{UE}$ could be included in the RRC request instead of the TA registration message. The eNB would then have to transfer the nonce$_{UE}$ to the MME.

It should be noted that the present invention was described above with particular reference to SAE/LTE systems and methods. However, it should be noted that the present invention may also be extended to other mobile communication systems even to communication systems in general.

The invention claimed is:

1. A security method for allowing secure communication in a communication system, the communication system containing a first entity, a second entity and a third entity, the first entity and the second entity share a first cryptographic key and a second cryptographic key, and the first entity and the third entity share a third cryptographic key, the method which comprises the steps of:

sending a first number from the first entity to the second entity;

sending a second number from the second entity to the first entity; and deriving a fourth temporary cryptographic key from at least one of the first, second and third cryptographic keys and at least one of the first and second numbers in at least one of the first entity and the second entity, the fourth cryptographic key being a refreshed version of the third cryptographic key and is derived to be used in place of the third cryptographic key;

wherein the first entity, the second entity, and the third entity are hardware entities;

wherein the first and second numbers are transmitted during an idle-to-active state transition; and wherein the first entity is user equipment, the second entity is a mobility management entity and the third entity is a base station.

2. The method according to claim 1, further comprising the steps of:
exchanging at least one of the first number, the second number and a third number between at least two of the first entity, the second entity and the third entity; and
deriving at least one of the fourth temporary cryptographic key and a fifth cryptographic key from at least one of the first, second and third cryptographic keys in at least one of the first entity, the second entity and the third entity from at least one of the first, second and third numbers.

3. The method according to 2, which further comprises forming the first, second and third numbers as nonces, a nonce is a number used only once in the communication system in conjunction with a relevant system parameter of the communication system.

4. The method according to claim 3, wherein the relevant system parameter of the communication system is the first cryptographic key.

5. The method according to claim 3, wherein the nonces are at least one of a random value, a non-repeating counter, a time-stamp and a temporary identity.

6. The method according to claim 1, which further comprises:
forming the first cryptographic key as one of a permanent and semi-permanent sixth cryptographic key; and
forming the second cryptographic key as at least one temporary seventh key; and
forming the third cryptographic key as at least one temporary eighth key.

7. The method according to claim 1, wherein the first and second numbers are the only numbers exchanged during the state transition.

8. The method according to claim 1, which further comprises:
reinitializing counters associated with at least one of the second and third cryptographic keys to arbitrary values after a new temporary ninth key was derived; and
selecting the counters from the group consisting of sequence numbers for replay protection and further counters for key stream synchronization.

9. The method according to claim 1, which further comprises:
forming the communication system as a SAE/LTE as described in 3G TR 23.882 and TS 23.402;
forming the third entity as an evolved NodeB in the SAE/LTE;
forming the first cryptographic key as key $K_{ASME}$ in 3G TR 33.821; and
selecting the second and third keys from the group consisting of $K_{NASenc}$, $K_{NASint}$, $K_{RRCenc}$, $K_{RRCint}$, $K_{UPenc}$ and $K_{eNB}$ as defined in 3G TR 33.821.

10. The method according to claim 9, which further comprises deriving $K_{NASenc}$ and $K_{NASint}$ directly from the first cryptographic key using the first and second numbers, without a further time-variant input in the first and second entities.

11. The method according to claim 10, which further comprises using the first and second entities to derive further new keys for at least one of the $K_{RRCenc}$, $K_{RRCint}$, $K_{UPenc}$ from the key $K_{eNB}$ without the further time-variant input.

12. The method according to claim 9, which further comprises deriving, via the first and second entities, a further new key $K_{eNB}$ directly from the first cryptographic key without a further time-variant input.

13. The method according to claim 12, which further comprises deriving, via the first and second entities, the further new keys for at least one of $K_{RRCenc}$, $K_{RRCint}$, $K_{UPenc}$ from the key $K_{eNB}$ respectively using at least one of the first and second numbers as an input.

14. The method according to claim 1, wherein the first entity sends the first number to the second entity in an initial Layer 3 message, as defined in 3G TR 23.882.

15. The method according to claim 1, wherein the second entity sends the second number in one of a Security Mode Command, as defined in 3G TR 33.821, and a TA registration confirmation for idle mode mobility, as defined in 3G TR 23.882.

16. The method according to claim 1, which further comprises exchanging the first and second numbers between the first entity and the third entity in one of a Radio Resource Control (RRC) connection request and a RRC setup message as defined in 3G TR 23.882 and TS 23.402.

17. The method according to claim 1, wherein the first number at least partially is related to a temporary user identity assigned by the second entity.

18. The method according to claim 1, which further comprises generating an evolved NodeB (eNB) nonce in the third entity, the eNB nonce at least partially relating to a temporary user identity assigned by the third entity.

19. The method according to claim 1, which further comprises:
storing the first cryptographic key in the first entity in a tamper-resistant hardware module, namely in a Universal Subscriber Entity Module (USIM) application on a UMTS IC Card (UICC) as defined in 3G TR 31.102, a derivation of temporary keys from the first cryptographic key and exchanged nonces shared is performed by the first entity on the tamper-resistant hardware module, and for each state transition in which the temporary keys are derived, a proof of the presence of the USIM application is provided to the communication network for protecting against attacks where manipulated terminals may retain the second or third cryptographic key or the first cryptographic key after the USIM application is removed.

20. A communication system, comprising:
a first entity;
a second entity;
a third entity;
said first entity and said second entity sharing a first cryptographic key and a second cryptographic key;
said first entity and said third entity sharing a third cryptographic key;
said first entity adapted for sending a first number from said first entity to said second entity;
said second entity is adapted for sending a second number from said second entity to said first entity; and
at least one of said first and second entities is adapted for deriving a fourth temporary cryptographic key from at least one of said first, second and third cryptographic keys and at least one of the first and second numbers, the fourth cryptographic key being a refreshed version of the third cryptographic key and is derived to be used in place of the third cryptographic key;
wherein said first entity, said second entity, and said third entity are hardware entities;
wherein the first entity is user equipment, the second entity is a mobility management entity and the third entity is a base station; and
wherein the first and second numbers are transmitted during an idle-to-active state transition.

21. The system according to claim 20, wherein said first, second and third entities are further adapted for:
 exchanging at least one of the first number, the second number and a third number between at least two of said first entity, said second entity and said third entity; and
 deriving at least one of the fourth temporary cryptographic key and a fifth cryptographic key from at least one of the first, second or third cryptographic keys in at least one of said first entity, said second entity and said third entity from at least one of said first, second and third numbers.

22. The system according to claim 20, wherein:
 the first cryptographic key is one of a permanent and semi-permanent sixth cryptographic key;
 the second cryptographic key is at least one temporary seventh key; and
 the third cryptographic key is at least one temporary eighth key.

23. The system according to claim 20, wherein the first, second and third numbers are nonces, a nonce is a number used only once in the communication system in conjunction with a relevant system parameter of the communication system.

24. The system according to claim 23, wherein the relevant system parameter of the communication system is the first cryptographic key.

25. The system according to claim 23, wherein the nonces are at least one of a random value, a non-repeating counter, a time-stamp and a temporary identity.

26. The system according to claim 20, further comprising counters associated with at least one of the second and third keys, wherein said counters are reinitialized to arbitrary values after a new temporary ninth key was derived, said counters are selected from the group consisting of sequence numbers for replay protection and further counters for key stream synchronization.

27. The system according to claim 20, wherein:
 the communication system is a SAE/LTE as described in 3G TR 23.882 and TS 23.402;
 said third entity is an evolved NodeB in the SAE/LTE;
 the first cryptographic key is a key $K_{ASME}$ in 3G TR 33.821; and
 the second and third keys are selected from the group consisting of $K_{NASenc}$, $K_{NASint}$, $K_{RRCenc}$, $K_{RRCint}$, $K_{UPenc}$ and $K_{eNB}$ as defined in 3G TR 33.821.

28. The system according to claim 27, wherein the system is further adapted for deriving $K_{NASenc}$, $K_{NASint}$ directly from the first cryptographic key using the first and second numbers, without further time-variant input in said first and second entities.

29. The system according to claim 28, wherein said first and second entities are adapted to derive further new keys for at least one of $K_{RRCenc}$, $K_{RRCint}$, $K_{UPenc}$ from the key $K_{eNB}$ without a further time-variant input.

30. The system according to claim 27, wherein said first and second entities are adapted to derive a further new key $K_{eNB}$ directly from the first cryptographic key without a further time-variant input.

31. The system according to claim 30, wherein said first and second entities are adapted to derive the further new keys for at least one of $K_{RRCenc}$, $K_{RRCint}$, $K_{UPenc}$ from the key $K_{eNB}$ respectively using at least one of the first and second numbers as an input.

32. The system according to claim 20, wherein said first entity sends the first number to said second entity in an initial Layer 3 message, as defined in 3G TR 23.882.

33. The system according to claim 20, wherein said second entity sends the second number in one of a security mode command, as defined in 3G TR 33.821, and a TA registration confirmation for idle mode mobility, as defined in 3G TR 23.882.

34. The system according to claim 20, wherein the first and second numbers are exchanged between said first entity and said third entity in one of a Radio Resource Control (RRC) connection request and a RRC setup message as defined in 3G TR 23.882 and TS 23.402.

35. The system according to claim 20, wherein the first number at least partially is related to a temporary user identity assigned by said second entity.

36. The system according to claim 20, wherein said third entity is further adapted for generating an evolved NodeB (eNB) nonce in said third entity, the eNB nonce at least partially relates to a temporary user identity assigned by said third entity.

37. The system according to claim 20, wherein said first entity contains a tamper-resistant hardware module, namely in a Universal Subscriber Entity Module (USIM) application on a UICC as defined in 3G TR 31.102, for storing the first cryptographic key in on, a derivation of temporary keys from the first cryptographic key and the exchanged nonces shared is performed by said first entity on said tamper-resistant hardware module, and for each state transition in which the temporary keys are derived, a proof of a presence of the USIM application is provided to the communication network for protecting against attacks where manipulated terminals, including rented terminals, may retain the second or third cryptographic key or the first cryptographic key after the USIM application is removed.

38. User equipment adapted to perform a security method for allowing secure communication in a communication system, the communication system containing the user equipment, a second entity and a third entity, the user equipment and the second entity share a first cryptographic key and a second cryptographic key, and the user equipment and the third entity share a third cryptographic key, the user equipment programmed to:
 send a first number to the second entity;
 receive a second number from the second entity and
 derive a fourth temporary cryptographic key from at least one of first, second or third cryptographic keys and at least one of the first and second numbers in at least one of the user equipment and the second entity, the fourth cryptographic key being a refreshed version of the third cryptographic key and is derived to be used in place of the third cryptographic key;
 wherein the second entity and the third entity are hardware entities;
 wherein the first and second numbers are transmitted during an idle-to-active state transition; and
 wherein the second entity is a mobility management entity and the third entity is a base station.

39. A mobility management entity adapted to perform a security method for allowing secure communication in a communication system, the communication system containing a first entity, the mobility management entity and a third entity, the first entity and the mobility management entity share a first cryptographic key and a second cryptographic key, and the first entity and the third entity share a third cryptographic key, the mobility management entity programmed to:
 receive a first number from the first entity;
 send a second number to the first entity; and
 derive a fourth temporary cryptographic key from at least one of first, second or third cryptographic keys and at least one of the first and second numbers in at least one of the first entity and the mobility management entity, the fourth cryptographic key being a refreshed version of the third cryptographic key and is derived to be used in place of the third cryptographic key;

wherein the first entity and the third entity are hardware entities;

wherein the first entity is user equipment and the third entity is a base station; and wherein the first and second numbers are transmitted during an idle-to-active state transition.

* * * * *